July 9, 1935.    C. F. KETTERING    2,007,608
TWO-CYCLE ENGINE
Filed May 27, 1931
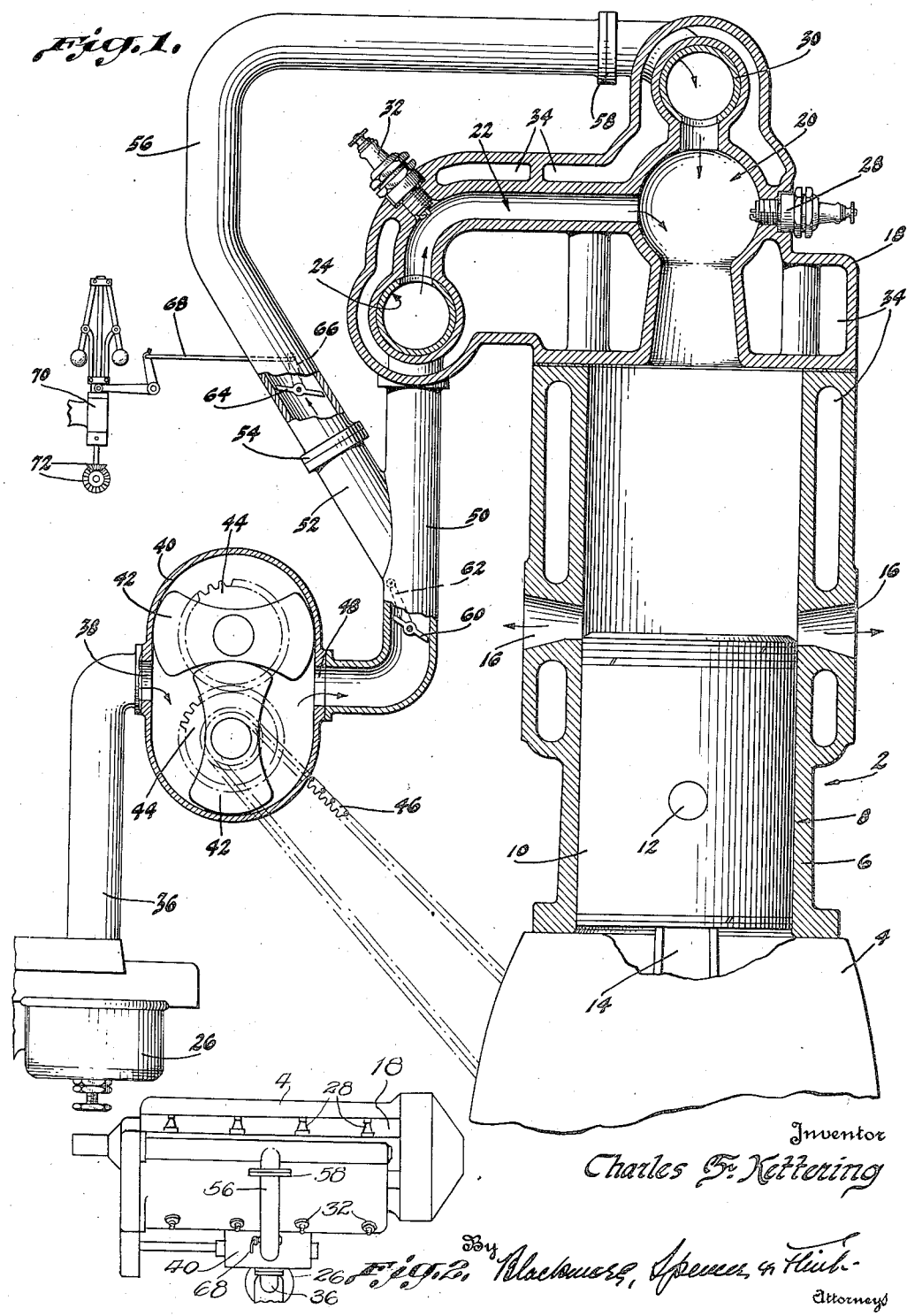

Patented July 9, 1935

2,007,608

UNITED STATES PATENT OFFICE 2,007,608

TWO CYCLE ENGINE

Charles F. Kettering, Dayton, Ohio, assignor, by mesne assignments, to General Motors Corporation, Detroit, Mich., a corporation of Delaware Application May 27, 1931, Serial No. 540,235

14 Claims. (Cl. 123—65)

This invention relates to two-cycle internal combustion engines and has particular reference to a system of manifolding whereby the idling and low running speeds of the engine is improved.

In two-cycle engines equipped with a blower and an attenuated firing chamber, difficulty has been experienced in obtaining good performance at idling and at low speeds. It is the purpose of the present invention to equip two-cycle engines with a manifolding system in which the carburetted fuel is localized adjacent the spark plug in an attenuated or relatively long and narrow portion of the combustion chamber so that better ignition and combustion is obtained. When the engine is running at higher and/or at full speeds, the localized charge and attenuated combustion chamber are no longer needed and may even be cut out of the system. When these higher speeds are reached, the carburetted fuel is passed through a second pipe or manifold and led to the firing chamber in closer proximity to the piston. At higher speeds ignition and combustion is not so great a problem because of the presence of more carburetted fuel and less burned gases so that it is unnecessary to localize the charge of carburetted fuel.

The second or high speed branch or manifold is controlled by a throttle valve which in turn is operated by a suitable governor. The greater the speed, the more will the governor open the throttle valve to allow a greater flow of carburetted fuel, and at high speeds the throttle is fully open. When the speed is low the governor will not open the throttle, thereby forcing the carburetted fuel to flow through a first branch or pipe and enter the attenuated combustion chamber and thereby cause a localization of the fuel charge about the spark plug, thereby insuring proper ignition and combustion.

On the drawing, Figure 1 is a sectional view through the pipes or manifolds and one cylinder of a multi-cylinder two-cycle internal combustion engine with the governor shown in a more or less schematic relation.

Figure 2 is a plan view of the engine.

Referring to the drawing, the numeral 2 indicates a multi-cylinder internal combustion engine as a whole. The engine has the crankcase 4 and engine block 6, while one of the cylinders is indicated at 8. The usual piston 10, connected as at 12 to the connecting rod 14, operates in the cylinder in the usual way. Exhaust ports for the cylinder are indicated at 16. Over the cylinder block 6, there is positioned the head 18 in which there is formed the combustion chamber 20. The combustion chamber has an attenuated branch portion 22 and a rotary valve 24 is mounted at the end thereof to control the admission of carburetted gas from the carburetor 26. A spark plug 28 is positioned at an enlarged portion of the combustion chamber 20 immediately beyond a rotary valve 30 shown as positioned at the top of the combustion chamber 20 in the head 18. A second spark plug 32 is positioned in the attenuated passage 22 immediately beyond the valve 24.

The usual water circulating system of the engine is indicated at 34.

A riser 36 leads from the carburetor 26 and delivers into the inlet 38 of a blower 40. The blower may be of any suitable type and in the drawing is illustrated as comprising the two figure 8 rotors 42 driven by suitable gearing 44. A chain 46 connects the blower to the crankshaft in any suitable way. The outlet 48 of the blower delivers into the pipe or riser 50 connected at its other end to the passage in the head 18 leading to the rotary valve 24. The riser 50 has the branch 52 connected as at 54 to a pipe or manifold 56 connected as at 58 to the head portion 18 leading to the valve 30.

The branch riser 50 is provided with a throttle valve 60 having an arm 62 connected to a suitable operating rod (not shown) and adapted to be manually operated.

The manifold 56 has a throttle valve 64 having a lever arm 66. A rod 68 connects the lever arm to a suitable governor 70, in the present instance shown to be of the fly-ball type. The governor 70 is driven from the crankshaft to the engine, such as by the gearing 72, in any suitable way. The governor operates to open the throttle valve 64 with an increase in speed and to close it with a decrease in the speed of the engine.

The operation of the device is as follows. At lower speeds, the operator cracks the throttle 60 a suitable amount so that the carburetted mixture will ascend in the pipe or riser 50 past the valve 24 into the attenuated passage 22 of the combustion chamber. When the piston has reached the bottom of its stroke, the blower will force the carburetted fuel into the combustion chamber and supply the new charge. On its upward stroke, the piston will compress the gases and force them backward into the firing chamber. Owing to the fact that the main portion of the chamber 20 will have a large amount of burnt gases therein, the spark plug 28 will be unable to give proper ignition. However, the charge about the spark plug 32 will largely be carburetted fuel so that the charge may be said to be localized about the spark plug 32. The fuel is therefore readily ignited and good combustion obtained. The attenuated passage 22 is relatively small and gives good performance of the engine at slow speeds and idling. As the speed increases, the quantity of fuel supplied to the combustion chamber is much greater so there is but little need for a localized charge. At higher speeds, the governor 70 will crack the throttle 64 to open the manifold 56 and allow the charge to pass to the valve 30 and directly into the firing chamber 20 to be ignited by the spark plug 28. The valve 24, spark plug 32, and attenuated chamber 22 will, of course, still be operating but their presence is not necessary at the high speeds.

When the engine slows down, the governor will gradually close the throttle 64 to again force the charge to enter past the valve 24 into the chamber 22.

I claim:

1. In a two-cycle engine having an interrelated blower and a carburetor, an intake pipe leading from the blower to the combustion chamber of the engine, means to control the flow of fuel through said pipe, a spark plug immediately beyond said means, a second intake pipe leading from the blower to the engine, means in said second pipe to control the flow of fuel therethrough, and speed responsive mechanism to operate said last named control means.

2. In a multi-cylinder two-cycle engine having an interrelated blower and a single carburetor, an intake pipe leading from the blower to the combustion chamber of the engine, a throttle for controlling the flow of fuel through said pipe, a valve in said pipe to control the admission of fuel to the combustion chamber, fuel ignition means in the combustion chamber immediately beyond said valve, a second intake pipe leading from the first pipe to the combustion chamber, a throttle in said second pipe to control the flow of fuel therethrough, speed responsive mechanism to control said second mentioned throttle, said means operating to open said throttle wider as the speed increases, a valve in said pipe to control the admission of fuel to the combustion chamber, and a second fuel ignition means in said chamber immediately beyond the second valve.

3. In a two-cycle engine having an interrelated blower and a carburetor, an intake pipe leading from the blower to the combustion chamber of the engine, means to control the flow of fuel through said pipe, a spark plug immediately beyond said means, a second intake pipe leading from the blower to the engine, said carburetor delivering the same quality of mixture to both intake pipes, and means in said second pipe to control the flow of fuel therethrough.

4. In a two-cycle engine having an interrelated blower and a carburetor, an intake pipe leading from the blower to the combustion chamber of the engine, means to control the flow of fuel through said pipe, a spark plug immediately beyond said means, a second intake pipe leading from the blower to the engine, means in said second pipe to control the flow of fuel therethrough, said carburetor delivering the same quality of mixture to both intake pipes, and means depending on the speed of the engine to operate said last named means.

5. In a two-cycle engine having an interrelated blower and a carburetor, an intake pipe leading from the blower to the engine, a valve to control the flow of fuel through said pipe, a fuel ignition means immediately beyond said valve, a second intake pipe leading from the blower to the engine, and means in said second pipe to control the flow of fuel therethrough, said carburetor delivering the same quality of mixture to both intake pipes, a valve in said second pipe, and fuel ignition means immediately beyond said valve.

6. In a multi-cylinder two-cycle engine having an interrelated blower and a carburetor, an intake pipe leading from the blower to the combustion chamber of the engine, a throttle for controlling the flow of fuel through said pipe, a valve in said pipe to control the admission of fuel to the combustion chamber, fuel ignition means in the combustion chamber immediately beyond said valve, a second intake pipe leading to the combustion chamber, said carburetor delivering the same quality of mixture to both intake pipes, a throttle in said second pipe to control the flow of fuel therethrough, means depending upon the speed of the engine to control said second mentioned throttle, said means operating to open said throttle wider as the speed increases, a valve in said pipe to control the admission of fuel to the combustion chamber, and a second fuel ignition means in said chamber immediately beyond the second valve.

7. In a two-cycle engine having an interrelated blower and a carburetor, an intake pipe leading from the blower to the combustion chamber of the engine, a second intake pipe leading from the blower to the engine, single means to control the flow of fuel through said pipes, said carburetor delivering the same quality of fuel mixture to both intake pipes, and a throttle in said second pipe to control the flow of fuel therethrough.

8. In combination with a two-cycle internal combustion engine, a carburetor, a blower to draw air through the carburetor, a pipe leading from the blower to the engine, a throttle in said pipe, a valve in said pipe to control the flow of carbureted air to the engine, fuel ignition means in said pipe beyond said valve, a second pipe connected to the first pipe beyond the throttle valve and leading to the engine, a throttle in said second pipe to control the flow of carbureted air therethrough, a valve in said second pipe to control the flow of carbureted air to the engine, and a second fuel ignition means at the engine beyond the end of the said second pipe.

9. In combination with a two-cycle internal combustion engine, a carburetor, a blower to draw air through the carburetor, a pipe leading from the blower to the engine, a throttle in said pipe, a valve in said pipe to control the flow of carbureted air to the engine, fuel ignition means in said pipe beyond said valve, a second pipe connected to the first pipe beyond the throttle valve and leading to the engine, a throttle in said second pipe to control the flow of carbureted air therethrough, a valve in said second pipe to control the flow of carbureted air to the engine, means to control said second throttle in accordance with the speed of the engine, and a second fuel ignition means at the engine beyond the end of the said second pipe.

10. In combination with a two-cycle internal combustion engine, a carburetor, a blower to draw air through the carburetor, a pipe leading from the blower to the engine, a throttle in said pipe, a valve in said pipe to control the flow of carbureted air to the engine, fuel ignition means in said pipe beyond said valve, a second pipe connected to the first pipe beyond the throttle valve and leading to the engine, a throttle in said second pipe to control the flow of carbureted air therethrough, a valve in said second pipe to control the flow of carbureted air to the engine, a governor operated from the engine and controlling the second throttle in accordance with the speed of the engine, and a second fuel ignition means at the engine beyond the end of the said second pipe.

11. In combination with a two cycle internal combustion engine, a carburetor, a blower to draw air through the carburetor, a pipe leading from the blower to the engine, a throttle in said pipe, a valve in said pipe to control the flow of carbureted air to the engine, a second pipe connected to the first pipe beyond the throttle valve and leading to the engine, a throttle in said second pipe to control the flow of carbureted air therethrough, and a valve in said second pipe to control the flow of carbureted air to the engine.

12. In combination with a two-cycle internal combustion engine, a carburetor, a blower to draw air through the carburetor, a pipe leading from the blower to the engine, a throttle in said pipe, a valve in said pipe to control the flow of carbureted air to the engine, a second pipe connected to the first pipe beyond the throttle valve and leading to the engine, a throttle in said second pipe to control the flow of carbureted air therethrough, a valve in said second pipe to control the flow of carbureted air to the engine, and means to control said second throttle in accordance with the speed of the engine.

13. In combination with a two-cycle internal combustion engine, a carburetor, a blower to draw air through the carburetor, a pipe leading from the blower to the engine, a throttle in said pipe, a valve in said pipe to control the flow of carbureted air to the engine, a second pipe connected to the first pipe beyond the throttle valve and leading to the engine, a throttle in said second pipe to control the flow of carbureted air therethrough, a valve in said second pipe to control the flow of carbureted air to the engine, and a governor operated from the engine and controlling the second throttle in accordance with the speed of the engine.

14. In a two-cycle engine having an interrelated blower and a carburetor, an intake pipe leading from the blower to the combustion chamber of the engine, means to control the flow of fuel through said pipe, a spark plug immediately beyond said means, a second intake pipe leading from the blower to the engine, said second pipe delivering fuel to the engine beyond the spark plug, a throttle in said second pipe to control the flow of fuel therethrough, and single means to control the flow of fuel through both pipes.

CHARLES F. KETTERING.